No. 848,542. PATENTED MAR. 26, 1907.
A. K. FERRIS.
PLAYING CARDS.
APPLICATION FILED MAR. 1, 1906.

WITNESSES:
Edward Wiemer
George Hulsberg

INVENTOR
Alonzo K. Ferris
BY W. C. Hauff
ATTORNEY

UNITED STATES PATENT OFFICE.

ALONZO K. FERRIS, OF NEW YORK, N. Y.

PLAYING-CARDS.

No. 848,542.     Specification of Letters Patent.     Patented March 26, 1907.

Application filed March 1, 1906. Serial No. 303,657.

*To all whom it may concern:*

Be it known that I, ALONZO K. FERRIS, a citizen of the United States, residing at New York city, in the county and State of New York, have invented new and useful Improvements in Playing-Cards, of which the following is a specification.

This invention relates to cards with interchangers or interchanging cards which can serve various purposes, as may be provided for.

This invention is set forth in the following specification and claims and illustrated in the annexed drawings, in which—

Figure 1:
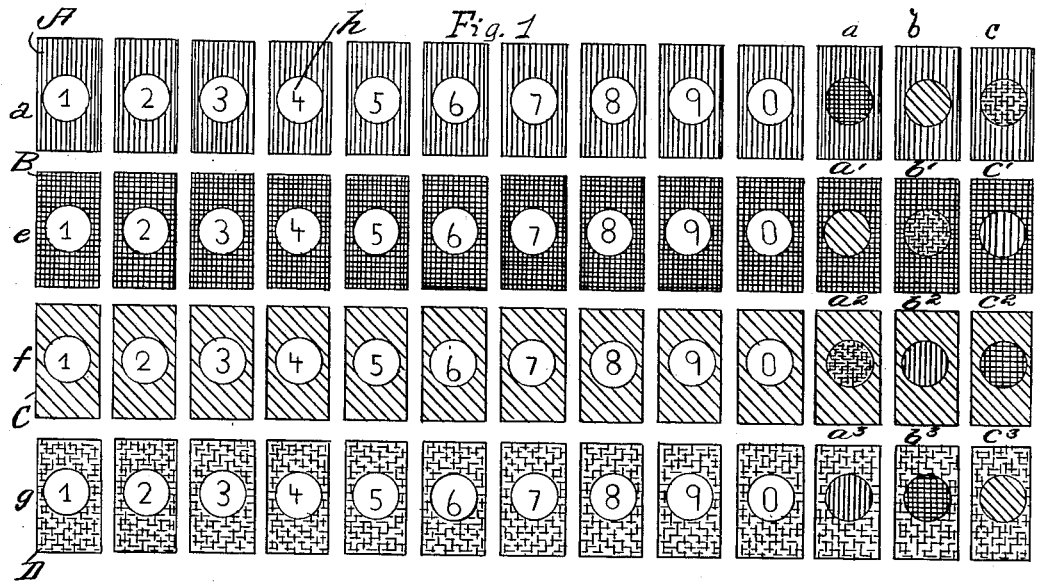
Figure 2:
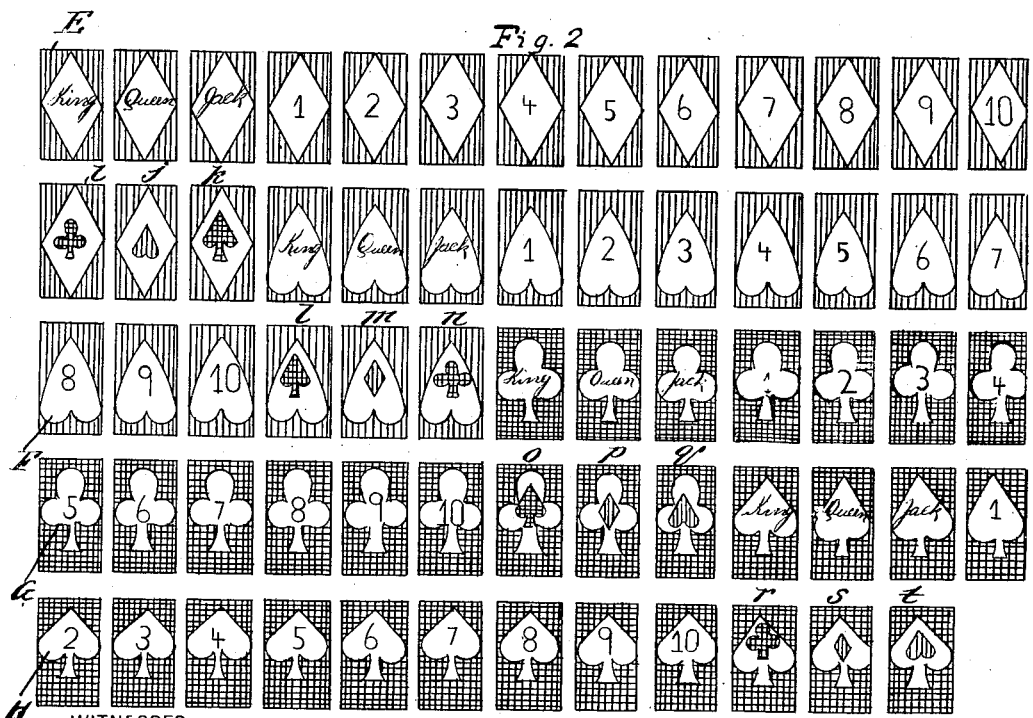

Figure 1 is a face view of a deck of cards embodying this invention, and Fig. 2 shows a modification.

A deck of playing-cards in accordance with this invention and, as shown in Fig. 1, comprises four sets of suit-cards $d\ e\ f\ g$, each suit comprising ten digit-cards, the digit-cards being indicated by the reference characters A, B, C, and D. The digit-cards of each suit are correspondingly colored and provided with a digit. The deck further comprises a plurality of interchanger-cards, preferably three in number, and each of which is adapted to force an adversary to play from a different suit. By way of example, the suit $d$ is red, the suit $e$ black, the suit $f$ green, and the suit $g$ yellow. The interchanger-cards of the suit $d$ are indicated by the reference characters $a$, $b$, and $c$, and the card $a$ has a portion thereof colored to correspond with the color of the suit $e$, the card $b$ has a portion thereof colored to correspond with the suit $f$, and the card $c$ has a portion thereof colored to correspond to the color of the suit $g$. The interchanger-cards of the suit $e$ are indicated by the reference characters $a'\ b'\ c'$, and the card $a'$ has a portion thereof colored to correspond to the color of the suit $f$, the card $b'$ has a portion thereof colored to correspond to the color of the suit $g$, and the card $c'$ has a portion thereof colored to correspond to the color of the suit $d$. The interchanger-cards of the suit $f$ are indicated by the reference characters $a^2$, $b^2$, and $c^2$. The card $a^2$ has a portion thereof colored to correspond to the suit $g$, the card $b^2$ has a portion thereof colored to correspond to the suit $d$, and the card $c^2$ has a portion thereof colored to correspond to the color of the suit $e$. The interchanger suit-cards of the suit $g$ are indicated by the reference characters $a^3$, $b^3$, and $c^3$. The card $a^3$ has a portion thereof colored to correspond to the color of the suit $d$, the card $b^3$ has a portion thereof colored to correspond to the color of the suit $e$, and the card $c^3$ has a portion thereof colored to correspond to the color of the suit $f$. Each of the interchanger-cards of a respective suit has the remaining portion thereof colored to correspond to the color of its respective suit. That portion of each of the interchanger suit-cards which is differently colored is arranged, by way of example, centrally of the card and substantially circular in contour. Each of the suit-cards, with the exception of the interchanger suit-cards, is suitably designated. By way of example, a circular uncolored space is provided centrally of each of the suit-cards, and in the said uncolored space a digit, as at $h$, is provided.

Suppose, for example, a player shows a tendency to build or play with the cards of the red suit $d$. Then if an opponent play on the red suit-card $d$ played by such player—an interchanger of the red, for example, said interchanger $a$, having a black center—the opponent will compel the player to begin building with the black suit-cards $e$. Such is the general outline of one way of using the cards; but the manner of playing is immaterial.

The modification shown in Fig. 2 shows the adaptation of the invention to an ordinary deck of playing-cards. The thirteen cards customarily for each suit are retained and the interchangers added. By the addition of the interchangers a deck is set forth consisting of sixty-four cards. In Fig. 2 the diamond-suit cards are indicated by the reference character E, the heart-suit cards by the reference character F, the club-suit cards by the reference character G, and the spade-suit cards by the reference character H. The interchangers for the diamond-suit cards are indicated by the reference character $i$, $j$, and $k$. The card $i$ is provided with a club-pip, the card $j$ with a heart-pip, and the card $k$ with a spade-pip. The interchangers for the heart-suit are indicated by the reference characters $l$, $m$, and $n$. The card $l$ is provided with a spade-pip, the card $m$ with a diamond-pip, and the card $n$ with a club-pip. The interchangers for the club-suit cards are indicated by the references $o$, $p$, and $q$. The card $o$ is provided with a spade-pip, the card $b$ with a diamond-pip, and the card $q$ with a heart-pip, and the interchangers for the spade-suit cards are indicated by the reference characters r s t. The card r is provided with a club-pip, the card s is provided with a diamond-pip, and the card t with a heart-pip.

Suppose such a deck is used, for example, in playing whist. If a player has led in the diamond-suit, then the next player, instead of following suit, could place on the diamond led an interchanger—for example, a diamond-card with a spot of another suit, as hearts, clubs, or spade. The next succeeding player would then be obliged to either follow in such changed suit or put on another interchange-card. This illustration is no limitation of the invention, but merely shows a manner of applying the invention.

A suitable design for the cards can be obtained, as seen. By having, for example, a suit, such as heart, formed by cards each having an inner field of the suit shape or shape of a heart, with suitably-colored border and interior number or designation, neat suits are obtained. The interchangers can be made by having the inner field—say of the heart-suit—provided with the suit to be interpolated—as, for example, a spade, a diamond, or club. Such interchangers in the heart-suit can be called "heart-spade," "heart-diamond," or "heart-club."

What I claim as my invention, and desire to secure by Letters Patent, is—

1. A deck of playing-cards, comprising a plurality of sets of suit-cards, the suit-cards of one set being correspondingly colored but differently colored with respect to the suit-cards of the other sets, a plurality of interchanger-cards for each set of suit-cards, the number of interchanger-cards of each set being less by one than the number of suits, each of the interchanger-cards for each set of suit-cards having a portion thereof of the same color as its suit, and further differently colored from the color of its suit but corresponding in color to the color of one of the other suits.

2. A deck of playing-cards comprising a plurality of sets of suit-cards, each of the cards of each of the sets of suit-cards being correspondingly indicated and further differently indicated with respect to each other, and interchanger-cards for each set of suit-cards, the number of the interchanger-cards of each suit being less by one than the number of suits, each of the interchanger-cards of one suit provided with an indication to indicate to which suit it belongs, and further provided with an indication corresponding to the indication of one of the other suits.

3. A deck of playing-cards comprising a plurality of sets of suit-cards, the suit-cards of each set being correspondingly colored and each provided with an indication different from one another, a plurality of interchanger-cards for each set of suit-cards, the number of the interchanger-cards of each set being less by one than the number of the suits, each of the interchanger-cards for each set of suit-cards having a portion thereof of the same color as its suit, and further provided with a portion differently colored from the color of the suit but corresponding in color to the color of one of the other suits.

4. A deck of playing-cards comprising four sets of suit-cards, the suit-cards of one set differently colored with respect to the suit-cards of the other sets, three interchanger-cards for each set of suit-cards, the said three interchanger-cards each having a portion thereof colored to correspond to the same color as its suit, one of said interchanger-cards having a portion correspondingly colored to one of the suits other than the suit to which the interchanger-card belongs, another of the interchanger-cards having a portion corresponding in color to another of the suits other than the suit to which the interchanger-card belongs, and the other of the interchanger-cards having a portion thereof correspondingly colored to the other of the suits other than that to which the interchanger-card belongs.

In testimony whereof I have hereunto set my hand in the presence of two subscribing witnesses.

ALONZO K. FERRIS.

Witnesses:
EDWARD WIESNER,
GEORGE HULSBERG.